US 8,990,007 B2

(12) United States Patent
Shikimachi et al.

(10) Patent No.: US 8,990,007 B2
(45) Date of Patent: Mar. 24, 2015

(54) VEHICULAR NAVIGATION DEVICE

(75) Inventors: Takeshi Shikimachi, Kariya (JP);
Osamu Kanematsu, Nagoya (JP)

(73) Assignee: DENSO CORPORATION, Kariya (JP)

(*) Notice: Subject to any disclaimer, the term of this patent is extended or adjusted under 35 U.S.C. 154(b) by 302 days.

(21) Appl. No.: 13/025,444

(22) Filed: Feb. 11, 2011

(65) Prior Publication Data
US 2011/0238294 A1 Sep. 29, 2011

(30) Foreign Application Priority Data

Mar. 23, 2010 (JP) ................................ 2010-066003

(51) Int. Cl.
*G01C 21/00* (2006.01)
*G01C 21/32* (2006.01)
*G01C 21/34* (2006.01)
*G01C 21/36* (2006.01)

(52) U.S. Cl.
CPC .............. *G01C 21/32* (2013.01); *G01C 21/34* (2013.01); *G01C 21/3667* (2013.01)
USPC ........... 701/410; 701/408; 701/409; 701/411; 701/413; 701/417; 701/454; 340/988; 340/990; 340/995.1; 340/995.19; 340/995.22; 340/995.23; 340/995.27

(58) Field of Classification Search
CPC ........ G01C 21/00; G01C 21/26; G01C 21/34; G01C 21/3407; G01C 21/36; G01C 21/3667; G08G 1/096833; G08G 1/096844; G08G 1/096855; G08G 1/096861
USPC ................. 701/400, 408–411, 413, 417, 454; 340/988, 990, 995.1, 995.19–995.23, 340/995.27
See application file for complete search history.

(56) References Cited

U.S. PATENT DOCUMENTS

| 4,982,332 | A | * | 1/1991 | Saito et al. ..................... 701/450 |
| 6,853,913 | B2 | * | 2/2005 | Cherveny et al. ............. 701/461 |
| 7,480,565 | B2 | * | 1/2009 | Ikeuchi et al. ................. 701/410 |
| 7,797,103 | B2 | * | 9/2010 | Ishigami et al. .............. 701/417 |
| 8,284,995 | B2 | * | 10/2012 | Diaz et al. ..................... 382/104 |
| 8,315,798 | B2 | * | 11/2012 | Shikimachi et al. .......... 701/450 |
| 8,380,432 | B2 | * | 2/2013 | Nakae et al. .................. 701/450 |
| 2006/0111837 | A1 | | 5/2006 | Tauchi |

(Continued)

FOREIGN PATENT DOCUMENTS

| EP | 0 564 140 A1 | 3/1993 | |
| JP | 6088732 A * | 3/1994 | ............. G01C 21/00 |

(Continued)

OTHER PUBLICATIONS

U.S. Appl. No. 12/911,293, filed Oct. 25, 2010, Nakamura et al.

(Continued)

*Primary Examiner* — Jack W Keith
*Assistant Examiner* — Chuong P Nguyen
(74) *Attorney, Agent, or Firm* — Posz Law Group PLC

(57) ABSTRACT

An identification unit identifies a departure point of a travel locus of a vehicle. The vehicle departs through the departure point from a departure road stored beforehand in map data. The map data has map link information including multiple links. An exit point set unit sets an exit point on a link included in the map link information. The link corresponds to the departure point of the departure road identified by the identification unit. A learning unit learns a new road based on the exit point set by the exit point set unit and the travel locus of the vehicle.

23 Claims, 15 Drawing Sheets

(56) References Cited

U.S. PATENT DOCUMENTS

| | | | |
|---|---|---|---|
| 2007/0038365 A1* | 2/2007 | An et al. | 701/200 |
| 2007/0213927 A1 | 9/2007 | Ishigami et al. | |
| 2008/0065327 A1* | 3/2008 | Sobue | 701/211 |
| 2008/0103692 A1* | 5/2008 | Nomura | 701/208 |
| 2009/0287410 A1* | 11/2009 | Kobayashi | 701/209 |
| 2010/0063727 A1* | 3/2010 | Umezu et al. | 701/208 |
| 2010/0179755 A1* | 7/2010 | Kohno et al. | 701/208 |
| 2012/0232789 A1* | 9/2012 | Nakamura | 701/430 |
| 2013/0013194 A1* | 1/2013 | Tsutsumi et al. | 701/430 |

FOREIGN PATENT DOCUMENTS

| | | | |
|---|---|---|---|
| JP | A-6-088732 | 3/1994 | |
| JP | A-6-088733 | 3/1994 | |
| JP | A-6-201392 | 7/1994 | |
| JP | A-8-062969 | 3/1996 | |
| JP | A-H9-292239 | 11/1997 | |
| JP | A-2000-121373 | 4/2000 | |
| JP | A-2002-013939 | 1/2002 | |
| JP | A-2005-69714 | 3/2005 | |
| JP | A-2007-047271 | 2/2007 | |
| WO | WO 2008/044375 A1 * | 4/2008 | G01C 21/00 |

OTHER PUBLICATIONS

Office Action mailed Jul. 10, 2012 in corresponding JP Application No. 2010-066003 (and English translation).

Office Action in corresponding Chinese application 201110075554.4 issued on Mar. 25, 2013.

Office action dated Dec. 11, 2013 in the corresponding CN Application No. 2011 1007 5554.4 (and English translation).

* cited by examiner

VEHICULAR NAVIGATION DEVICE

CROSS REFERENCE TO RELATED APPLICATION

This application is based on and claims priority to Japanese Patent Application No. 2010-66003 filed on Mar. 23, 2010.

FIELD OF THE INVENTION

The present invention relates to a vehicular navigation device configured to detect information on a road such as the shape of the road and register the detected information in map data when a vehicle travels on the road.

BACKGROUND OF THE INVENTION

A known vehicular navigation device (e.g., refer to Japanese Patent 2778374, JP-A-2006-170970, JP-A-2007-271602, JP-A-2007-47271, and JP-A-6-27876) has a road learning function such that when a vehicle travels on a road unregistered in map data, the vehicular navigation device detects the shape of the unregistered road and registers the detected shape in the map data. Such a vehicular navigation device has a technical thought to obtain a travel locus using various sensors such as a GPS satellite system and detect the shape of a road based on the obtained travel locus. The vehicular navigation device is further configured to store the travel locus between a start point and an end point automatically and register an unregistered new road automatically.

More specifically, Japanese Patent 2778374 discloses a navigation device configured to detect a travel distance of a vehicle, detect a traveling direction of the vehicle, and calculate a travel locus of the vehicle based on the detected travel distance and the detected traveling direction at a predetermined travel distance interval. The navigation device is further configured to calculate an estimated position of the vehicle based on road map data and the calculated travel locus of the vehicle and indicate the estimated position of the vehicle on a road map around the vehicle. The navigation device has a function such that when the vehicle travels on an unregistered road, which is not registered in a map storage device, the navigation device converts data format of a travel locus of the unregistered road calculated by a travel-locus calculation unit into data format of road map data stored in the map storage device. In this way, the navigation device stores the travel-locus data of the unregistered road.

JP-A-2006-170970 discloses a method to determine a point through which a self-vehicle departs from a registered road stored in map data. The JP-A-2006-170970 discloses a method such that when the vehicle travels on a road toward a T-junction and when the position of the vehicle does not coincide with a road position, the navigation device performs a map matching operation to calculate a map matching position, which coincides with the road position. When the vehicle starts traveling on a road, which is not stored in the map data, the navigation device calculates the map matching position to coincide with a road near the self-vehicle.

JP-A-2007-271602 discloses a technical thought to shift a travel locus in parallel, while a self-vehicle is traveling on an unregistered road, such that a start point of the travel locus including the unregistered road coincides with the coordinates where detection of the unregistered road is started. Thereafter, the travel locus is affine-transformed such that the end point of the travel locus coincides with the coordinates of a detection end point of the unregistered road. Thereby, the travel locus including the unregistered road is obtained. In this technical thought, when a road verification unit and the travel locus show a matching state, it is determined whether the travel locus is within the road width. When it is determined that the travel locus is not within the road width, a road departure point is set to the coordinates of the present position of the vehicle. In this case, the road departure point is set on a registered road rearward by a predetermined distance.

JP-A-2007-47271 discloses a technical thought to connect the self-positions so as to obtain a travel locus as a new road, when the map matching of the self-position cannot be carried out, and update road information. Thereafter, the new road is evaluated according to a deviation between the self-position and the new road. According to this technical thought, congruent points between both data are obtained in consideration of the difference between the length of a polygonal line of the update information and the length of a polygonal line obtained from a position detection result in the evaluation. Further, coordinates average of the congruent points are obtained as a correction result. In this way, an intermediate position between update information and the position detection result in the evaluation can be calculated as the correction result.

It is noted that, in general, a vehicle travels on one side of a road. That is, when a vehicle travels on a road, a road shape deviated from a center position of an intersection may be detected. When a vehicle turns on an unregistered road such as an intersection, a travel locus of the vehicle may be in a curved shape. Consequently, a road shape different from an actual road shape may be stored. Such a difference may be significant in a right-angled intersection, for example.

SUMMARY OF THE INVENTION

In view of the foregoing and other problems, it is an object of the present invention to produce a vehicular navigation device configured to learn an unregistered road correctly.

According to one aspect of the present invention, a vehicular navigation device comprises an identification unit configured to identify a departure point through which a travel locus of a vehicle departs from a departure road stored beforehand in map data, the map data storing map link information including a plurality of links. The vehicular navigation device further comprises an exit point set unit configured to set an exit point on a link included in the map link information, the link corresponding to the departure point of the departure road identified by the identification unit. The vehicular navigation device further comprises a learning unit configured to learn a new road based on the exit point set by the exit point set unit and the travel locus of the vehicle.

According to another aspect of the present invention, a vehicular navigation device comprises an identification unit configured to identify an entry point through which a travel locus of a vehicle enters an entry road stored beforehand in map data, the map data storing map link information including a plurality of links. The vehicular navigation device further comprises a return point set unit configured to set a return point on a link included in the map link information, the link corresponding to the entry point of the entry road identified by the identification unit. The vehicular navigation device further comprises a learning unit configured to learn a new road based on the return point set by the return point set unit and the travel locus of the vehicle.

According to another aspect of the present invention, a method for learning a new road for a vehicular navigation device, the method comprises identifying a departure point through which a travel locus of a vehicle departs from a departure road stored beforehand in map data, the map data storing map link information including a plurality of links. The method further comprises setting an exit point on a link included in the map link information, the link corresponding to the identified departure point of the departure road. The method further comprises obtaining a new road based on the set exit point and the travel locus of the vehicle to learn the new road.

According to another aspect of the present invention, a method for learning a new road for a vehicular navigation device, the method comprises identifying an entry point through which a travel locus of a vehicle enters an entry road stored beforehand in map data, the map data storing map link information including a plurality of links. The method further comprises setting a return point on a link included in the map link information, the link corresponding to the identified entry point of the entry road. The method further comprises obtaining a new road based on the set return point and the travel locus of the vehicle to learn the new road.

BRIEF DESCRIPTION OF THE DRAWINGS

The above and other objects, features and advantages of the present invention will become more apparent from the following detailed description made with reference to the accompanying drawings. In the drawings:

FIGS. 10A to 10D are explanatory views showing the correction operation when a vehicle turns leftward to exit from a road, wherein FIG. 10A shows input data, FIG. 10B shows an in-road-width shape deletion operation, FIG. 10C shows a connection point correction operation, and FIG. 10D shows an in-road-width interpolation operation;

FIGS. 11A to 11D are explanatory views showing the correction operation when a vehicle turns rightward to exit from a road, wherein FIG. 11A shows the input data, FIG. 11B shows the in-road-width shape deletion operation, FIG. 11C shows the connection point correction operation, and FIG. 11D shows the in-road-width interpolation operation;

FIGS. 12A to 12D are explanatory views showing the correction operation when a vehicle turns leftward to return to a road, wherein FIG. 12A shows the input data, FIG. 12B shows the in-road-width shape deletion operation, FIG. 12C shows the connection point correction operation, and FIG. 12D shows the in-road-width interpolation operation;

FIGS. 13A to 13D are explanatory views showing the correction operation when a vehicle turns rightward to return to a road, wherein FIG. 13A shows the input data, FIG. 13B shows the in-road-width shape deletion operation, FIG. 13C shows the connection point correction operation, and FIG. 13D shows the in-road-width interpolation operation;

DETAILED DESCRIPTION OF PREFERRED EMBODIMENTS (Embodiment)

Figure 1:
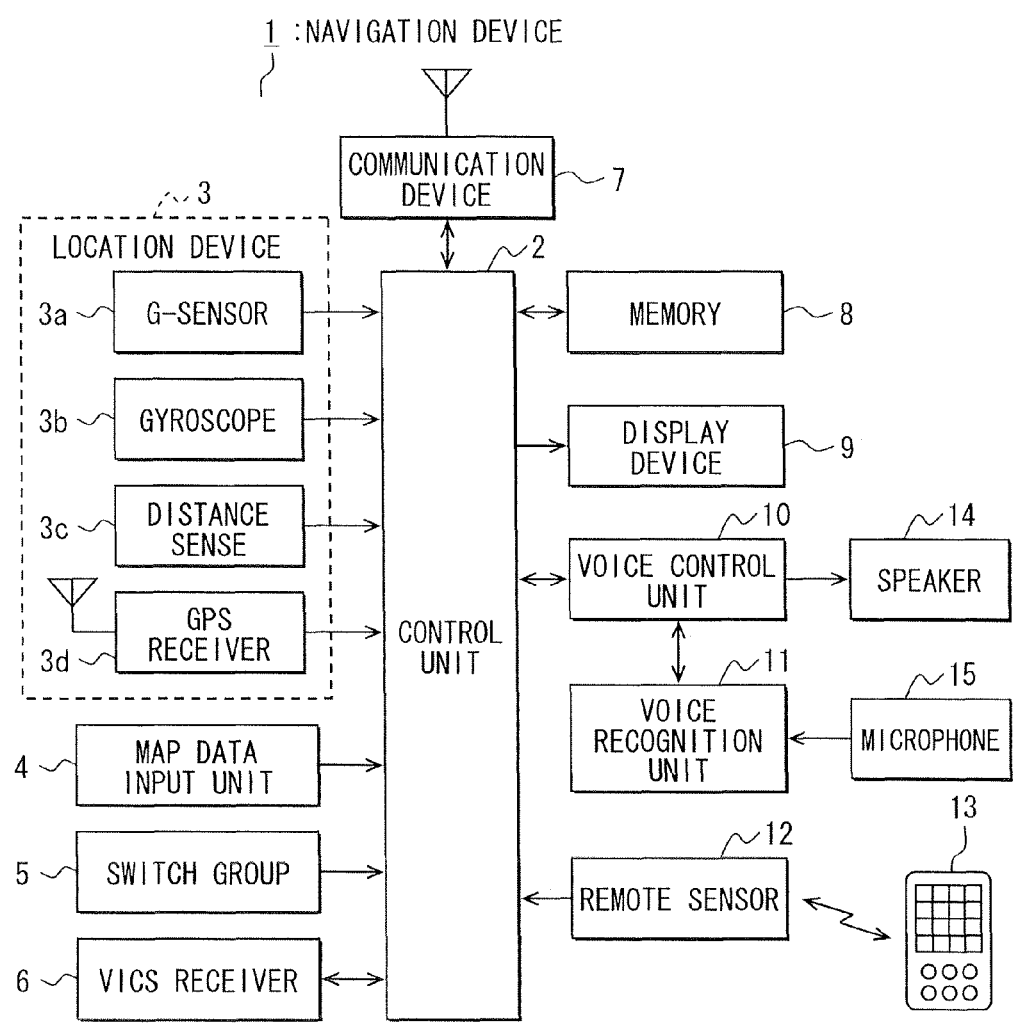
FIG. 1 is a block diagram showing an electronic configuration of a vehicular navigation device according to an embodiment of the present invention.

As follows, an embodiment will be described with reference to drawings. FIG. 1 is a block diagram showing an electronic configuration of a vehicular navigation device.

As shown in FIG. 1, the vehicular navigation device 1 includes a control unit 2. The control unit 2 is connected with a location unit 3, a map data input unit 4, an operation switch group 5, a VICS (registered trademark) receiver 6, a communication device 7, an external memory 8, a display device 9, a voice controller 10, a voice recognition unit 11, and a remote controller sensor 12. The remote controller sensor 12 is connected with a remote controller 13 via infrared communications. The voice controller 10 is connected with a speaker 14. The voice recognition unit 11 is connected with a microphone 15.

The control unit 2 includes a CPU, a RAM, a ROM, and an I/O bus (none shown) and controls an operation of total vehicular devices by executing a control program. The location unit 3 includes a G-sensor (gravity sensor) $3a$, a gyroscope $3b$, a distance sensor $3c$, and a GPS receiver $3d$. Each of the sensors and components of the location unit 3 has a detection error characteristic different from each other. The control unit 2 receives detection signals from the sensors and components of the location unit 3 and complements the detection signals each other to detect (specify) the present position of the vehicle.

It is noted that the location unit 3 need not have all the sensors and components. The location unit 3 may include part of the sensors and components, as long as being capable of detecting the present position of the vehicle with a required detection accuracy. The location unit 3 may further include at least one or a combination of a steering wheel sensor for detecting a steering angle of a steering wheel and a wheel sensor for detecting rotation of a wheel.

The map data input unit 4 includes a storage medium such as a CD-ROM, a DVD-ROM, a memory card, or an HDD for storing map data, map matching data, and the like. The operation switch group 5 includes a mechanical key located around the display device 9 and a touch key formed on an indication screen of the display device 9, for example. The operation switch group 5 outputs an operation detection signal to the control unit 2 on detection of an operation of a user, for example. The operation of a user is, for example, an instruction to select a menu indication, an instruction to set a destination, an instruction to search a route, an instruction to start route guidance, an instruction to change indication screen, an instruction to control a sound volume, and the like.

A VICS receiver 6 performs broadband communications through a wide area network and receives VICS information from a VICS center device (not shown) through the wide area network. The external, memory 8 is configured of a mass storage device such as an HDD device.

The display device 9 is, for example, a collar LCD device and configured to indicate various screens such as a menu selection screen, a destination set screen, a route guidance screen, and the like. The display device 9 is further configured to superimpose a present position mark representing the present position of the vehicle, a travel locus, and the like on a map specified by the map data. The display device 9 may be an organic electroluminescence (EL) device, a plasma display device, or the like.

The voice controller 10 causes the speaker 14 to output various sounds such as an alarm, a guidance voice for route guidance, and the like. The voice recognition unit 11 is controlled by the control unit 2. The voice recognition unit 11 has a voice-recognition algorithm to perform voice recognition of a voice inputted from the microphone 15 when being activated. The remote controller sensor 12 is configured to receive an operation signal from the remote controller 13 and transmit an operation signal to the control unit 2 when receiving the operation signal.

The control unit 2 includes function units such as a map data acquisition unit, a map matching unit, a route searching unit, a route guidance unit, a graphic unit, and the like. The map data acquisition unit is for obtaining the map data. The map matching unit is for specifying a road where the present position of the vehicle exists based on the present position of the vehicle and road data included in the map data obtained by the map data acquisition unit. The route searching unit is for searching a path from the present position of the vehicle specified by the map matching unit to a destination set by a user. The route guidance unit is for calculating a point needed for route guidance according to the path searched by the route searching unit, the road data and position data of an intersection included in the map data and performing route guidance. The graphic unit is for drawing a map around the present position of the vehicle, a schematic illustration of a highway, an enlarged image around an intersection, and the like.

Figure 2:
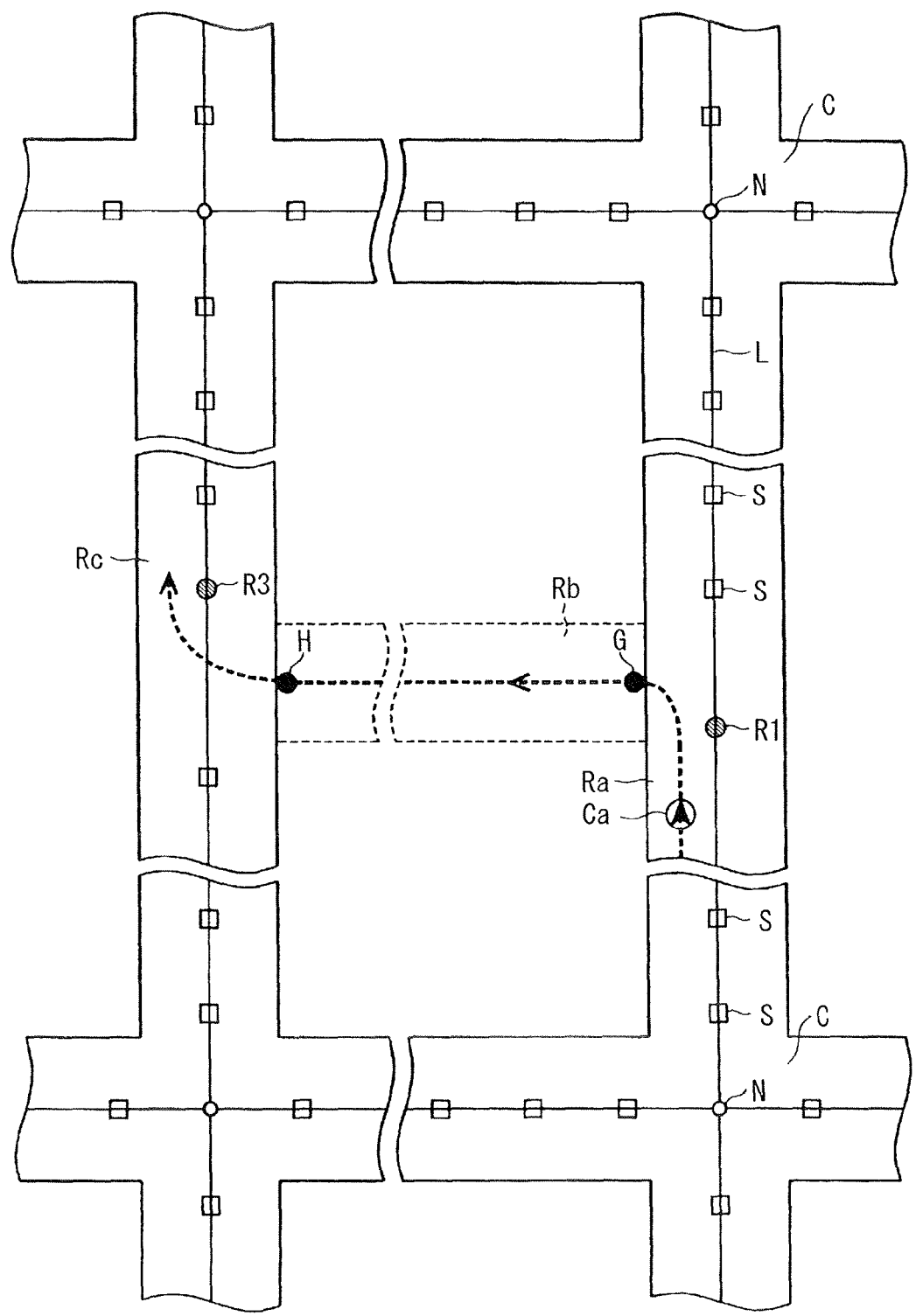
FIG. 2 is an explanatory view showing a link being set between nodes.

FIG. 2 is a schematic view showing road data stored as the map data. The map data is configured of road data including nodes N each being set at the center of a corresponding intersection C and a link L, which joins nodes N therebetween. For example, as shown in FIG. 2, it is supposed that a vehicle Ca travels on the left side in a one-lane linear road. In this case, the one-lane linear road has one lane for each side. In this case, a link L, which joins nodes N each being on the center of an intersection C, is set at the center in the road width direction.

The link L is assigned with multiple shape points S on a path between nodes N. The shape points S are correspondingly assigned with shape data such as the width and the height. The shape data is stored correspondingly to the road data of the link L. When a user sets a destination, the control unit 2 sets the destination and starts route guidance.

As follows, a new road learning operation of the navigation device with the above-described configuration will be described. In the following description of the new road learning operation, as shown in FIG. 2, it is supposed that the vehicle Ca travels along a departure road Ra, which is beforehand registered in the map data. Subsequently, the vehicle Ca departs from the departure road Ra through a departure point G. Subsequently, the vehicle Ca travels on an unregistered new road Rb, which is not registered in the map link information. Subsequently, the vehicle Ca travels along an entry road Rc, which is beforehand registered in the map link information.

It is supposed that the new road learning operation according to the present embodiment satisfies the following preconditions. In a precondition 1, when the vehicle turns rightward or leftward to enter a road or depart from a road, it is assumed that the vehicle travels on a lane closest to the side of the right or left turn. In a precondition 2, it is assumed that a new learned road has one lane.

Figure 3:
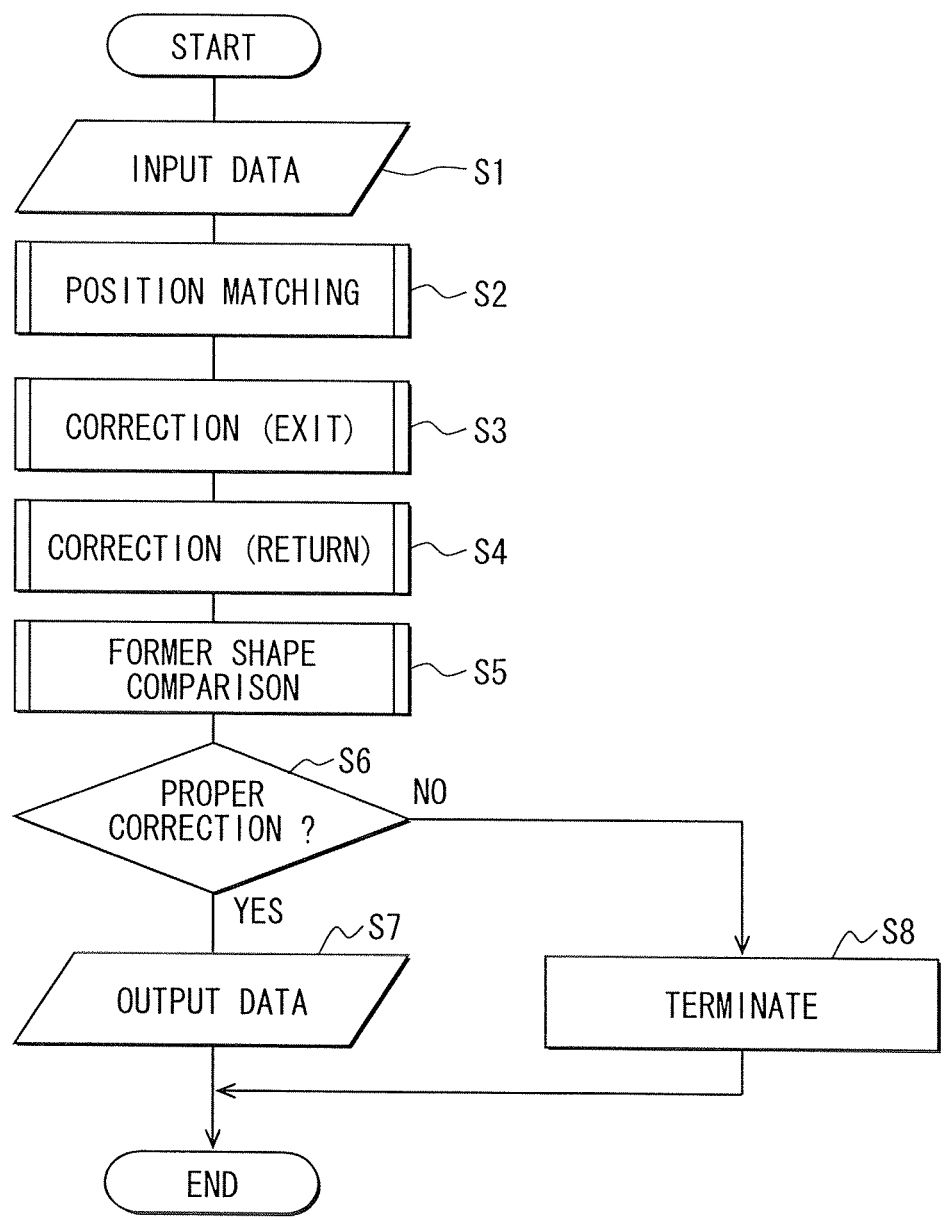
FIG. 3 is a flowchart showing a learning operation of a new road.

FIG. 3 is a flowchart showing the new road learning operation, which the control unit mainly executes. Through a series of traveling of the vehicle Ca on a road (departure road Ra), traveling on the unregistered new road Rb, and going into the entry road Rc, as shown in FIG. 3, at S1, the control unit 2 first obtains input data, and subsequently performs the learning operation. The input data may include coordinates of a exit point R1, coordinates of a return point R3, a travel locus of the vehicle Ca from a detection position of the exit point R1 to a detection position of the return point R3 (FIG. 2), an exit link ID, a exit link shape, a return link ID, a return link shape, a correction parameter such as the width and the number of lanes.

The coordinates of the exit point R1 (exit point before correction) represents coordinates of the position immediately before a map matching operation is disabled. When the map matching operation is disabled, detection information on the present position of the vehicle cannot be matched (identified) on the link L of the map link information. The exit link ID and the exit link shape represent identification information and shape data of the link L on the exit point R1. Contrary, the coordinates of the return point R3 (return point before correction) represents coordinates of the position where the map matching operation is enabled. When the map matching operation is enabled, detection information on the present position of the vehicle can be matched (identified) on the registered link L of the map link information.

The travel locus of the vehicle Ca represents position information detected at, for example, a predetermined distance interval such as 2 meters. A return link ID and the return link shape represent identification information and shape data of the link on the return point. A correction parameter represents the width of the departure road, the width of the entry road, and the number of lanes.

Figure 4:
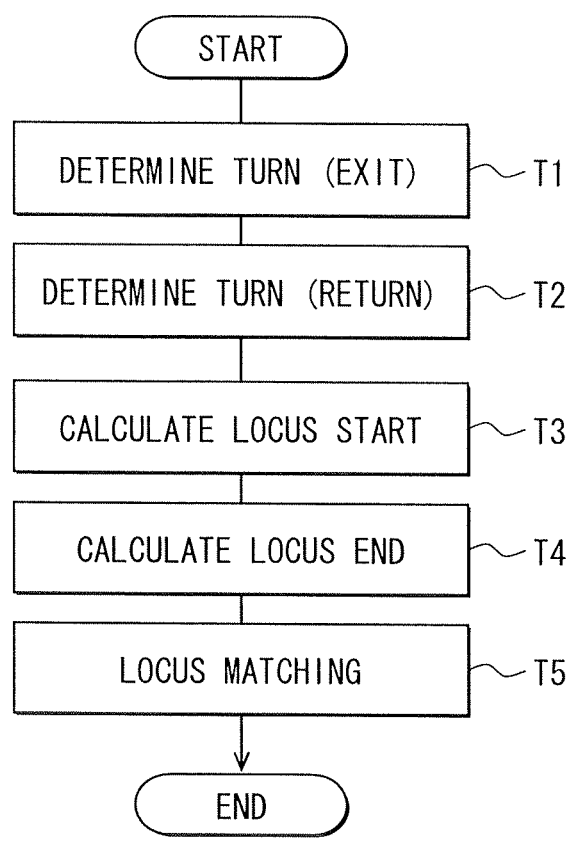
FIG. 4 is a flowchart showing a travel-locus position matching operation.
Figure 5A:
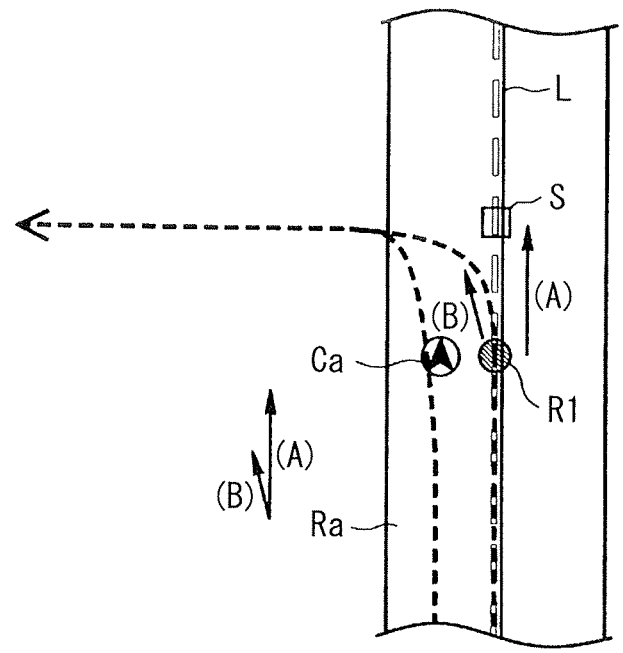
FIG. 5A is an explanatory view showing a right or left turn determination operation when a vehicle exits from a road.

In FIG. 3, at S2, the control unit 2 subsequently performs a position matching operation of the travel locus of the vehicle Ca. FIG. 4 is a flow chart showing the position matching operation of the travel locus of the vehicle Ca. As shown in FIG. 4, at steps T1, T2, the control unit 2 first performs a right or left turn determination operation for the departure road Ra on the side of exit and the entry road Rc on the side of return. FIG. 5A shows the right or left turn determination operation in the departure road Ra on the side of exit, and FIG. 5B shows the right or left turn determination operation in the entry road Rc on the side of return.

As shown in FIG. 5A, when the vehicle Ca departs from a one-lane road, for example, a travel-locus start point is matched to the exit point R1 on the link L of the map link information. For example, a vehicle travels on a left side lane in Japan in compliance with the left-hand traffic regulation. Therefore, the travel locus of the vehicle Ca is slightly deviated from the center of the road Ra to the left side in reality. In consideration of this, a travel locus matching operation is executed.

Subsequently, a vector A is compared with a vector B. The vector A is directed from the exit point R1 to the shape point S of the link L in the latest traveling direction. The vector B is on the travel-locus start point. It is determined to be left turn when the direction of the vector B is deviated counterclockwise relative to the direction of the vector A by an angle greater than or equal to 0 degree and less than 180 degrees. Contrary, it is determined to be right turn when the direction of the vector B is deviated clockwise relative to the direction of the vector A by an angle greater than or equal to 0 degree and less than 180 degrees.

Figure 5B:
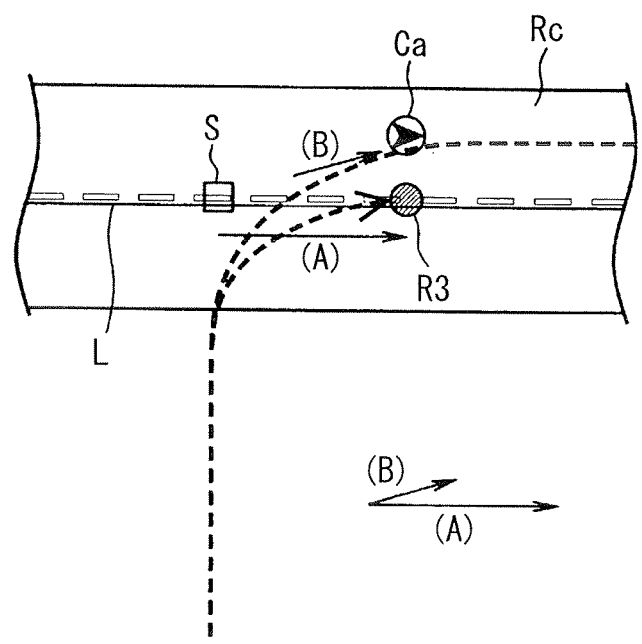
FIG. 5B is an explanatory view showing the right or left turn determination operation when a vehicle returns to a road.

As shown in FIG. 5B, the right or left turn determination operation is performed for the entry road Rc on the side of return. Similarly to the above-described way, a vector A is compared with a vector B to determine whether the vehicle makes a left turn or right turn. In this case, the vector A is directed to the return point R3 from the latest shape point S of the latest link L in an opposite direction from the traveling direction of the return point R3. The vector B is on the travel-locus end point.

Figure 6A:
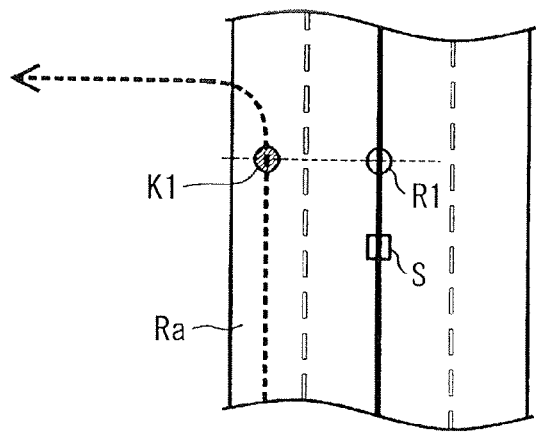
FIG. 6A is an explanatory view showing a travel-locus start position calculation operation when a vehicle turns leftward.
Figure 6B:
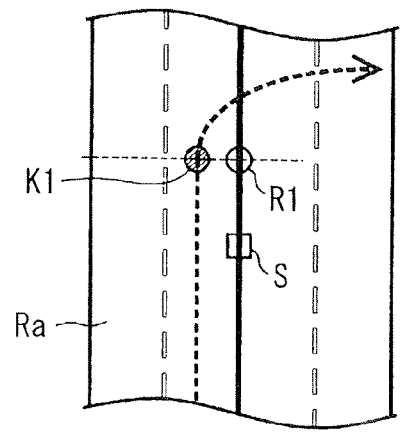
FIG. 6B is an explanatory view showing the travel-locus start position calculation operation when a vehicle turns rightward.

Subsequently, as shown in FIG. 4, at steps T3, T4, the control unit 2 executes a calculation operation of a start position K1 of the travel locus in the departure road Ra on the side of exit and a calculation operation of an end position K2 of the travel locus in the entry road Rc on the side of return. FIG. 6A shows a calculation operation of the start position K1 of the travel locus in a state of left turn on the departure road Ra on the side of exit. FIG. 6B shows a calculation operation of the start position K1 of the travel locus in a state of right turn on the departure road Ra on the side of exit. The present example represents a case of a two-lane road. The two-lane road has two lanes for each side. As shown in FIG. 6A and FIG. 6B, the departure road Ra is divided by the number of lanes of the departure road Ra. The center line of the lane on the most left side (when left turn) or the center line of the lane on the right side (when right turn) and a straight line, which is perpendicular to a line between the exit point R1 and the shape point S of the immediately preceding link L, have an intersection representing the travel-locus start point K1.

Figure 7A:
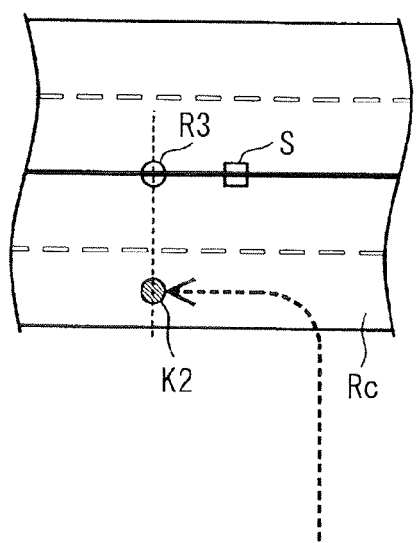
FIG. 7A is an explanatory view showing a travel-locus end position calculation operation when a vehicle turns leftward.
Figure 7B:
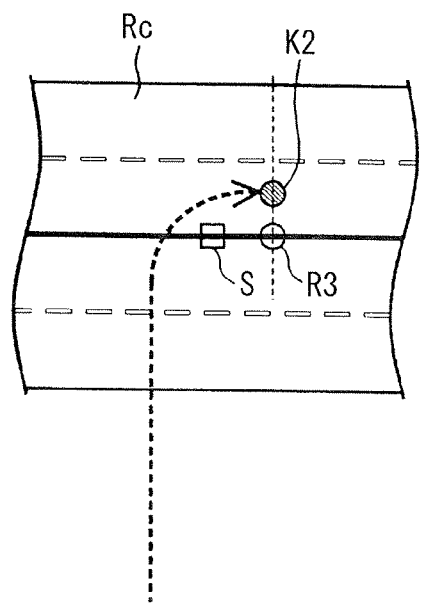
FIG. 7B is an explanatory view showing the travel-locus end position calculation operation when a vehicle turns rightward

FIG. 7A shows a calculation operation of the end position K2 of the travel locus in a state of left turn on the entry road Rc on the side of return. FIG. 7B shows a calculation operation of the end position K2 of the travel locus in a state of right turn on the entry road Rc on the side of return. As shown in FIG. 7A and FIG. 7B, the entry road Rc is divided by the number of lanes of the entry road Rc. The center line of the lane on the most left side (when left turn) or the center line of the lane on the right side (when right turn) and a straight line, which is perpendicular to a line between the return point R3 and the shape point S of the immediately preceding link L, have an intersection representing the travel-locus end point K2.

Figure 8:
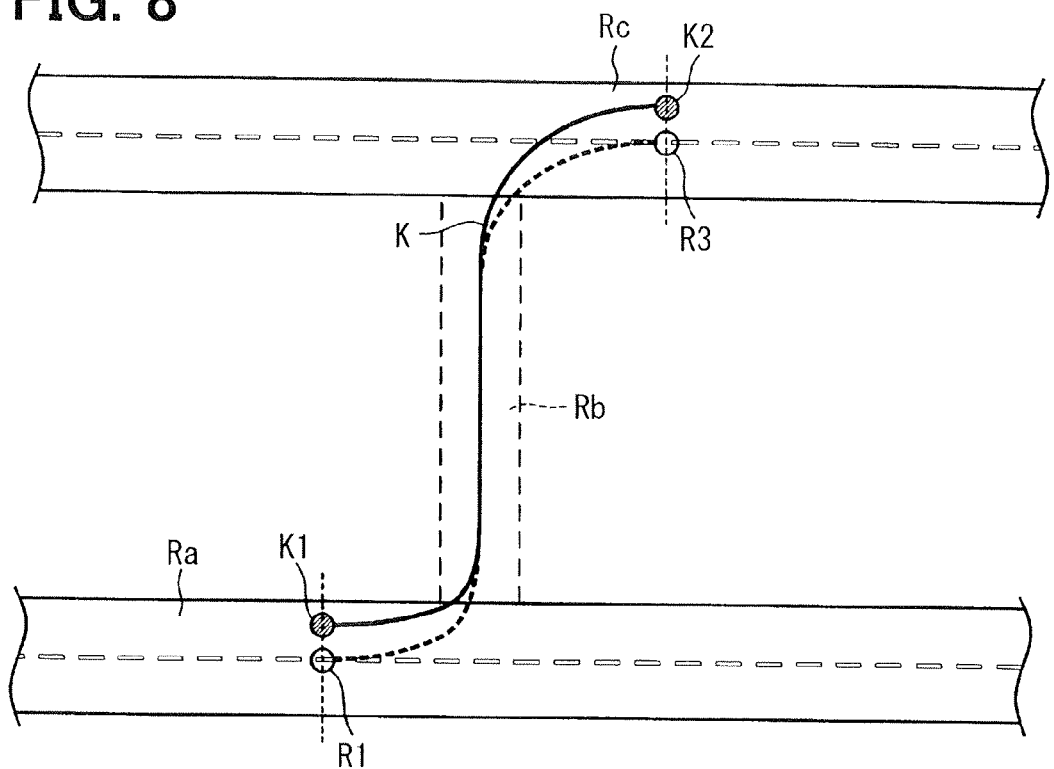
FIG. 8 is an explanatory view showing a travel locus matching operation.

Subsequently, in FIG. 4, at step T5, the control unit 2 executes the travel locus matching operation. FIG. 8 is a schematic view showing the travel locus matching operation. As shown in FIG. 8, the entire shape is matched to the travel-locus start point K1 and the travel-locus end point K2. Specifically, the matching is performed by executing a processing such as a rotation operation or an extension operation. Thus, the travel-locus position matching operation at step S2 in FIG. 3 is completed.

Figure 9:
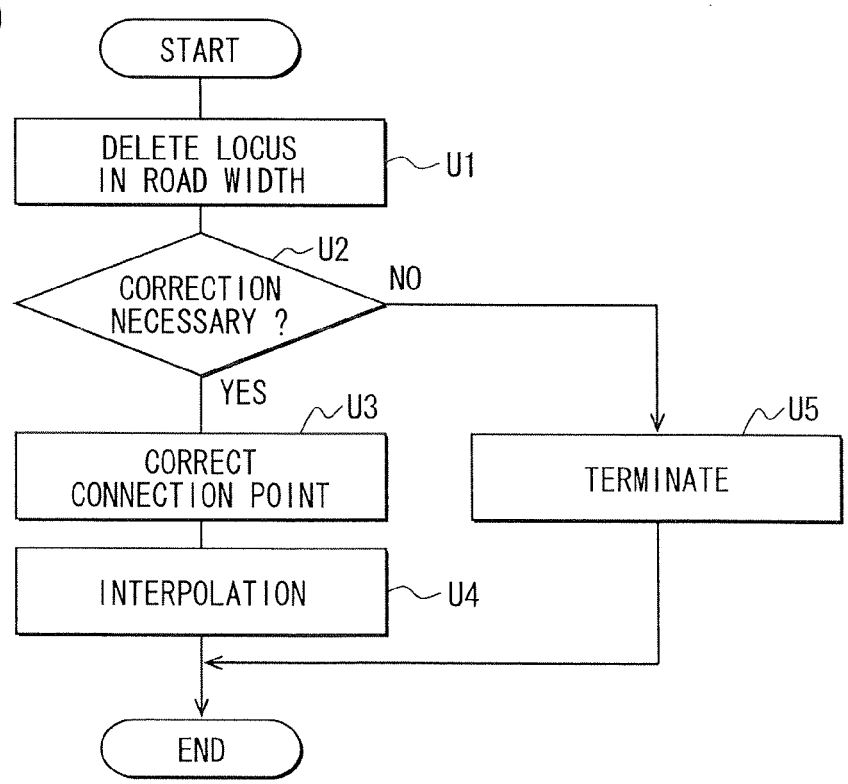
FIG. 9 is a flowchart showing a correction operation when a vehicle exits from a road and when a vehicle returns to a road.

Subsequently, as shown in FIG. 3, at step S3, the control unit 2 executes a correction operation on the side of exit. Further, at step S4, the control unit 2 executes a correction operation on the side of return. FIG. 9 is a flow chart showing the correction operations. Specifically, at U1, the control unit 2 executes an in-road-width shape deletion operation. At U2, the control unit 2 determines whether a correction is required. When correction is required (U2: YES), at U3, the control unit 2 executes a connection point correction operation. Subsequently, at U4, the control unit 2 executes an in-road-width interpolation operation. At step U2, when the control unit 2 determines that a correction s unnecessary (U2: NO), the processing is skipped. As follows, the in-road-width shape deletion operation (U1), the connection point correction operation (U3), and the in-road-width interpolation operation (U4) will be described in detail.

Figure 10A:
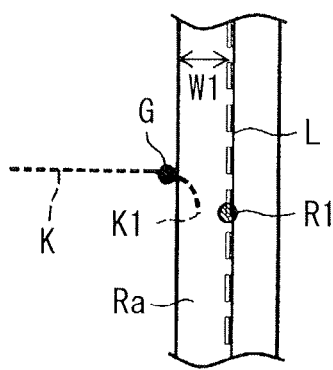

FIGS. 10A to 10D are explanatory views each showing the in-road-width shape deletion operation at step U1, the connection point correction operation at step U3, the in-road-width interpolation operation at step U4 when the vehicle travels on the left side (left-hand traffic) and makes a left turn to depart from the departure road at step S3. FIG. 10A shows data of the travel locus K before and after the vehicle moves from the travel-locus start point K1 to depart from the departure road Ra. In this case, the road width is set to a width W1 of one lane.

Figure 10B:
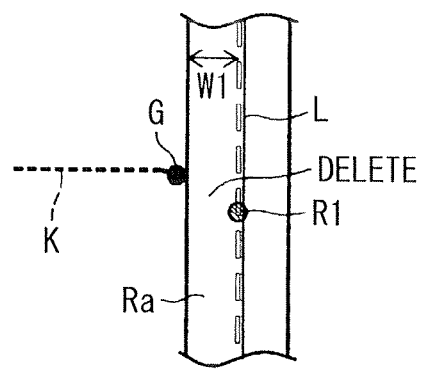

In the in-road-width shape deletion operation at step U1, the control unit 2 deletes a portion of the travel locus in a region in the road width W1 of the cruising lane on the side of the exit point R1. In this case, as shown in FIGS. 10A, 10B, the deleted region is a locus from the travel-locus start point K1 to a point through which the vehicle departs from the region of the road width W1 (road-width region). In this way, the control unit 2 deletes the locus in the region of the road width W1. Subsequently, the control unit 2 identifies a departure point G, which is the position of a portion of the first travel locus K near the exit point R1.

Figure 10C:
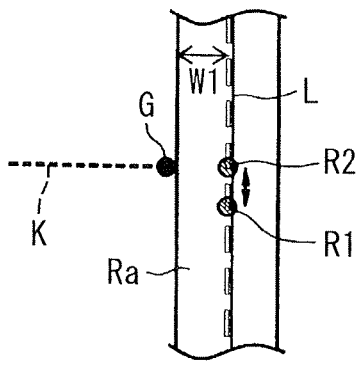

Subsequently, in the connection point correction operation at step U3, as shown in FIG. 10C, the control unit 2 predicts the center point of the intersection C and corrects the exit point R1 to obtain a exit point R2 after correction. The correction method may be one of the following methods (1) to (4).

(1) Moving the exit point R1 before correction in the traveling direction of the vehicle Ca along the link L by a turning radius of the vehicle Ca (e.g., 10 m) to obtain the exit point R2 after correction. (2) Calculating an average direction of continuous locus positions of two or more points (e.g., three points) of the travel locus K from the departure point G, extending a line segment from the departure point G in the average direction, and calculating an intersection between the extended line segment and the link L registered beforehand to obtain the exit point R2 after correction. (3) Extending a line segment between the departure point G of the travel locus K and a subsequent point of the travel locus K and calculating an intersection between the extended line segment and the link L registered beforehand to obtain the exit point R2 after correction. (4) Adopting the method (2) on condition that an angular deviation between the traveling directions of the vehicle obtained at a predetermined distance interval such as 2 meters is converged into a predetermined value or less. The method (4) is adopted to calculate the average direction after the traveling direction of the vehicle Ca is converged in consideration that the direction, in which the new road Rb extends, cannot be properly determined according to data obtained while the vehicle Ca is turning. When the method of (4) is adopted, the new road Rb may be determined in a desirable correct direction.

Figure 10D:
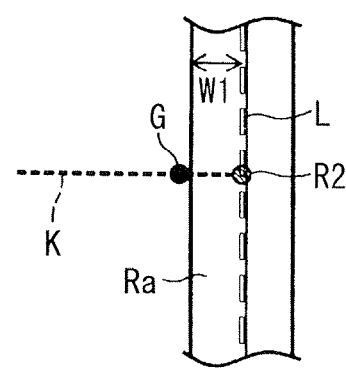

The exit point R2 after correction may be set to any one of points in the object link L between the nodes N to N of the intersections C. Alternatively, the exit point R2 after correction may be set in an adjacent link L, which is adjacent to the object link L across the node N. Subsequently, in the in-road-width interpolation operation at step U4, the control unit 2 interpolates between the exit point R2 after correction and the departure point G of the travel locus K with, for example, a straight line to obtain a travel locus K after interpolation. Thus, as shown in FIG. 10D, the control unit 2 obtains the entire travel locus K after interpolation as a candidate of a new road Rb.

Figure 11A:
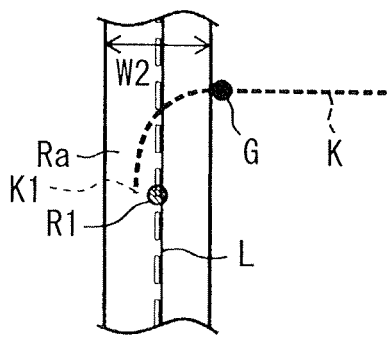
Figure 11B:
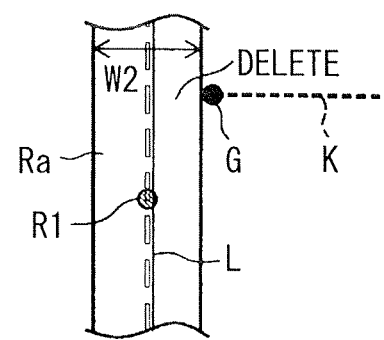
Figure 11C:
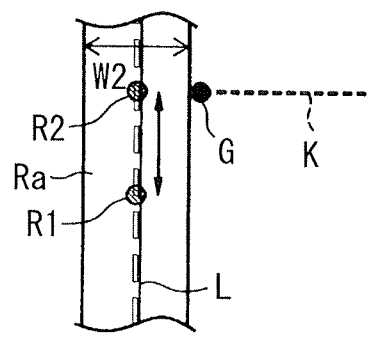
Figure 11D:
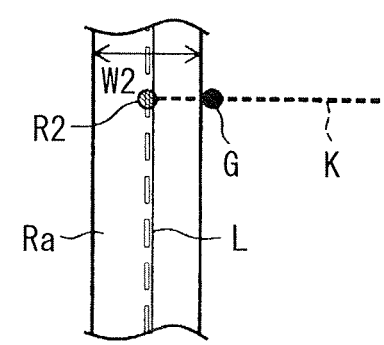

FIGS. 11A to 11D are explanatory views each showing the in-road-width shape deletion operation at step U1, the connection point correction operation at step U3, the in-road-width interpolation operation at step U4 when the vehicle travels on the left side (left-hand traffic) and makes a right turn to exit from the departure road Ra at step S3 in FIG. 3. FIG. 11A shows data of the travel locus K before and after the vehicle moves from the travel-locus start point K1 to depart from the departure road Ra. The vehicle Ca goes from the cruising lane through the opposite lane into an object road (right-turn road) when making a right turn. In this case, the road width W2 is set to a two-side width including the width of the cruising lane and the width of the opposite lane. Except for this operation, the present operation is substantially the same as the operation described with reference to FIGS. 10B to 10D, and detailed description is omitted. FIG. 11B is an explanatory view showing the in-road-width shape deletion operation, FIG. 11C is an explanatory view showing the connection point correction operation, and FIG. 11D is an explanatory view showing the in-road-width interpolation operation.

FIGS. 12A to 12D are explanatory views each showing the in-road-width shape deletion operation at step U1, the connection point correction operation at step U3, the in-road-width interpolation operation at step U4 when the vehicle makes a left turn in a left-hand traffic to return to the entry road Rc at step S4 in FIG. 3.

Figure 12A:
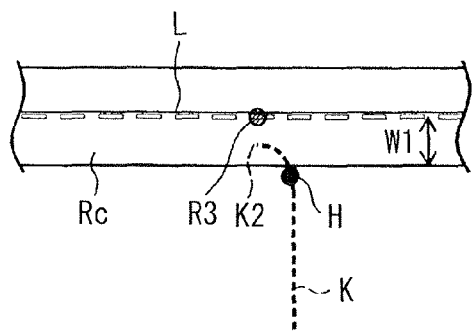
Figure 12B:
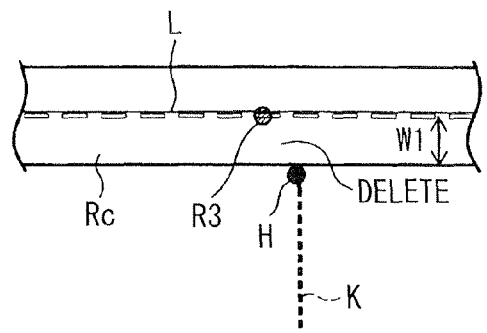

In the in-road-width shape deletion operation at step U1, the control unit 2 deletes a portion of the travel locus K in a region in the road width W1 of the cruising lane on the side of the return point R3. In this case, as shown in FIG. 12B, the portion of the travel locus to be deleted is the region between the travel-locus end point K2 and the point at which the travel locus extends beyond the road width W1. The portion of the travel locus K included in the road width W1 is deleted, and the end point of the travel locus K, which is close to the return point R3, is obtained as an entry point H.

Figure 12C:
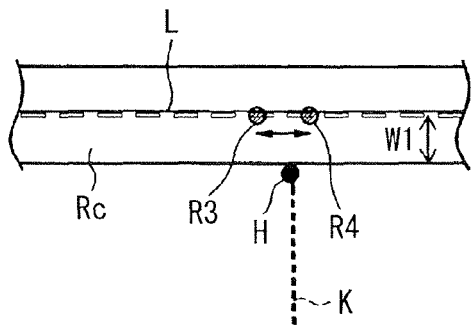

Subsequently, in the connection point correction operation at step U3, as shown in FIG. 12C, the control unit 2 predicts the center point of the intersection C and corrects the entry point R3 to obtain an entry point R4 after correction. The correction method may be one of the following methods (5) to (8). (5) The entry point R3 before correction is moved in the opposite direction from the traveling direction of the vehicle Ca by a turning radius of the vehicle Ca (e.g., 10 m) to obtain the entry point R4 after correction. (6) Calculating an average direction of continuous locus positions of two or more points (e.g., three points) of the travel locus K from the entry point H in the opposite direction, extending a straight line from the entry point H in the average direction, obtaining an intersection between the extended straight line and the link L registered beforehand as the entry point R4 after correction. (7) Extending a line segment between the entry point H of the travel locus K and a subsequent point of the travel locus K in the opposite direction and calculating an intersection between the extended line segment and the link L registered beforehand to obtain the entry point R4 after correction. (8) Adopting the method (6) on condition that an angular deviation, which is between opposite directions from the traveling directions of the vehicle obtained at a predetermined distance interval such as 2 meters, is converged into a predetermined value or less.

Figure 12D:
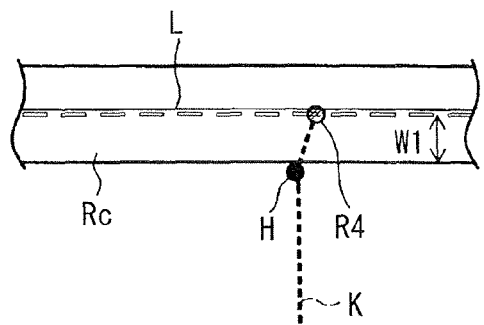

The entry point R4 after correction may be set to any one of points in the object link L. Alternatively, the entry point R4 after correction may be set in an adjacent link L, which is adjacent to the object link L across the node N. Subsequently, in the in-road-width interpolation operation at step U4, the control unit 2 interpolates between the entry point R4 after correction and the entry point H of the travel locus K to obtain a travel locus K after interpolation. Thus, as shown in FIG. 12D, the control unit 2 obtains the entire travel locus K after interpolation as a candidate of a new road Rb.

Figure 13A:
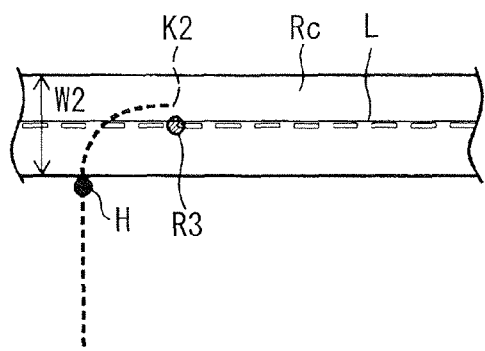
Figure 13B:
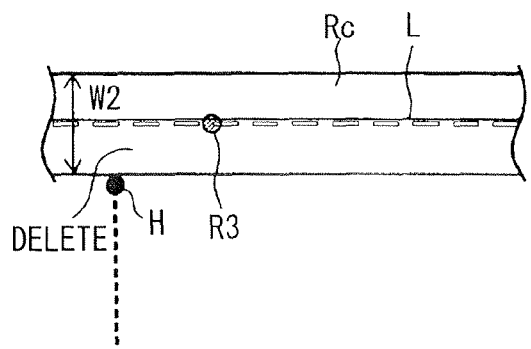
Figure 13C:
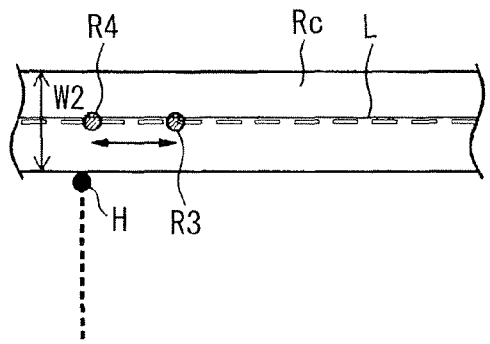
Figure 13D:
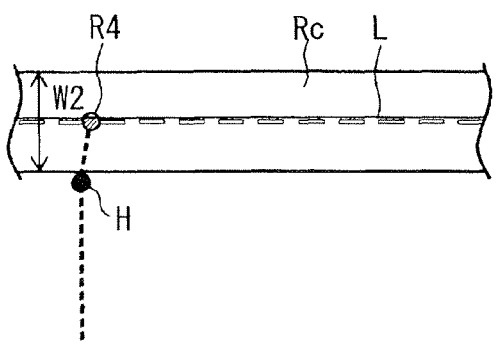

FIGS. 13A to 13D are explanatory views each showing the in-road-width shape deletion operation at step U1, the connection point correction operation at step U3, the in-road-width interpolation operation at step U4 when the vehicle makes a right turn in a left-hand traffic to return to the entry road Rc at step S4 in FIG. 3. FIG. 13A shows data of the travel locus K until the vehicle returns to the travel-locus end point K2 of the entry road Rc. The vehicle Ca goes through the opposite lane into the cruising lane when making a right turn to return to the entry road Rc. In this case, the road width W2 is set to a two-side width including the width of the cruising lane and the width of the opposite lane. Except for this operation, the present operation is substantially the same as the operation described with reference to FIGS. 12B to 12D, and detailed description is omitted. FIG. 13B is an explanatory view showing the in-road-width shape deletion operation, FIG. 13C is an explanatory view showing the connection point correction operation, and FIG. 13D is an explanatory view showing the in-road-width interpolation operation.

There are various modes when the vehicle departs from a departure road or returns into an entry road. As described above, the new road Rb may be newly constructed on a side of an existing road in the road width direction. In this case, for example, when the vehicle Ca departs from a road (departure road Ra) registered beforehand, the vehicle Ca may depart toward the new road Rb on the side of the existing road in the road width direction. Alternatively, a new road Rb may be newly constructed from a road end portion R5 in a traveling direction or in right or left turn direction. That is, the new road Rb may be continued from a dead end of the existing road, which is previously closed in the traveling direction.

Figure 14:
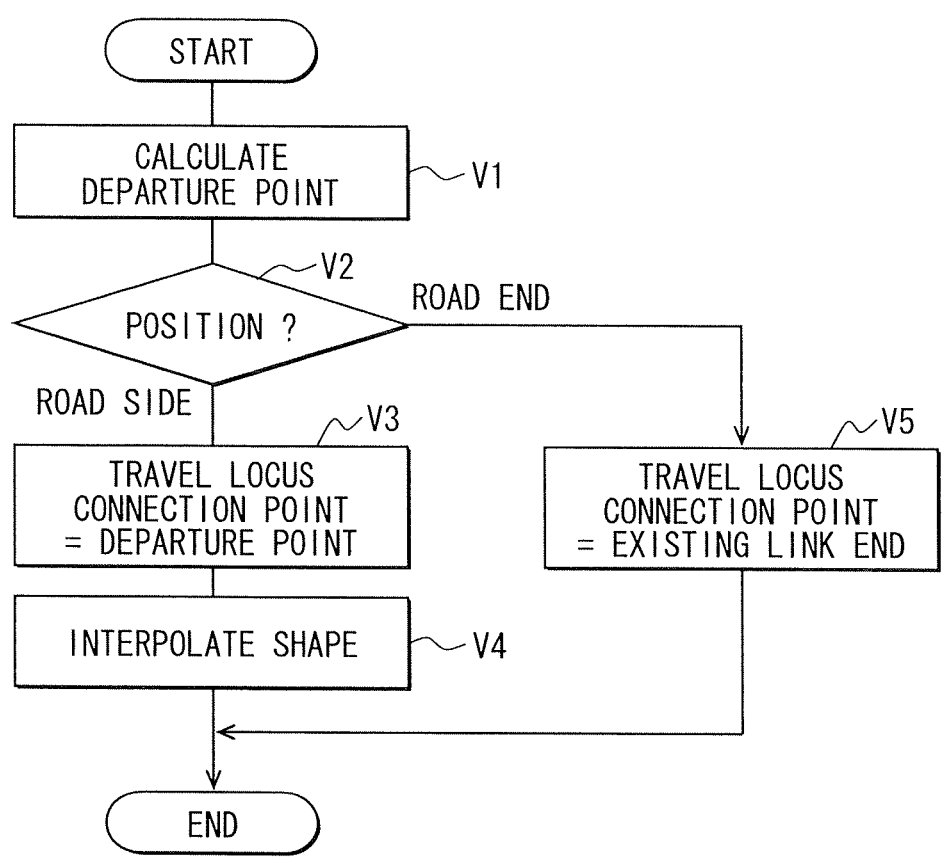
FIG. 14 is a flowchart showing a method for setting an exit point on and around a road end portion.

In consideration of this, the control unit 2 may execute the operation shown in FIG. 14 instead of or in addition to the operations of steps U3, U4 in FIG. 9. Specifically, at step V1, the control unit 2 calculates a departure point G of a travel locus K. At step V2, the control unit 2 determines whether the departure point G is a road end portion (dead end) R5 or a road side end. When the departure point G is a road side end, at steps V3, V4, the control unit 2 interpolates the shape included in the road width such that the travel locus K is connected with the departure point G. In this case, the operations are similar to those of the above description.

When the control unit 2 determines that the departure point G is a road end portion R5, at step V5, the control unit 2 connects the departure point G of the travel locus K with a terminal node N of the existing link L. The present operation is executed, since the termination of the link L is assigned beforehand with a node N.

Figure 15A:
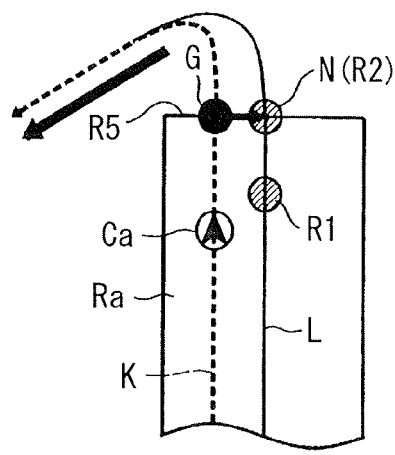
FIG. 15A is an explanatory view showing a method for setting an exit point when a vehicle departs from a road through a road end portion.

FIG. 15A is an explanatory view showing an operation when the vehicle departs from a road end portion. As shown in FIG. 15A, when the vehicle Ca departs from the road end portion R5 of the departure road Ra, a point, where the vehicle departs from a region specified in the map data, is obtained as a departure point G, and a terminal node N of the road end portion R5 corresponding to the departure point G is obtained as a exit point R2 after correction.

Figure 16A:
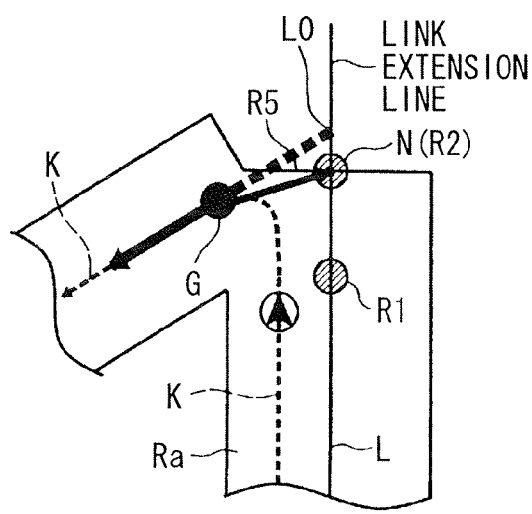
FIG. 16A is an explanatory view showing a method for setting an exit point when a vehicle departs from a road through a region around a road end portion.

As shown in FIG. 16A, when the vehicle Ca departs from a road side end and turns rightward or leftward immediately before the road end portion R5, the exit point R1 is corrected in one of the above-described methods (1) to (4). For example, when the control unit 2 sets the exit point R2 after correction in the above-described method (2), the control unit 2 determines whether the link L intersects an extension line extended from the travel locus in the average direction from the departure point G. When the link L intersects the extension line, the control unit 2 sets the exit point R2 after correction on the link L.

Alternatively, as shown in FIG. 16A, the link L may not exist on the extension line extended from the departure point G in the average direction. In this case, the exit point R2 after correction is set to the terminal node N of the road end portion R5 on the side of a point, which is denoted by the reference numeral L0 in FIG. 16A. The point L0 is an intersection between the extension line of the travel locus K, which is extended from the departure point G in the average direction, and the extension line of the link L. In this way, the exit point R2 can be set on the existing link L and may be useful.

Figure 15B:
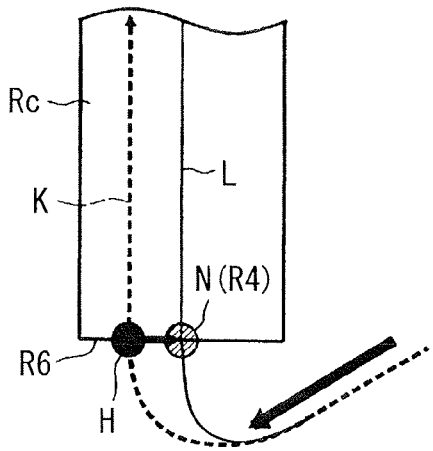
FIG. 15B is an explanatory view showing a method for setting a return point when a vehicle enters a road through a road start portion.

In the above description, the relation between the departure point G and the exit point R2 after correction is explained. In addition, the relation between the entry point H and the return point R4 after correction is the same as that relation of departure. Specifically, as shown in FIG. 15B, when the vehicle Ca passes through the new road Rb and goes through the existing road start portion R6, the return point R4 is set to the start end node N of the road start portion R6 corresponding to the entry point H.

Figure 16B:
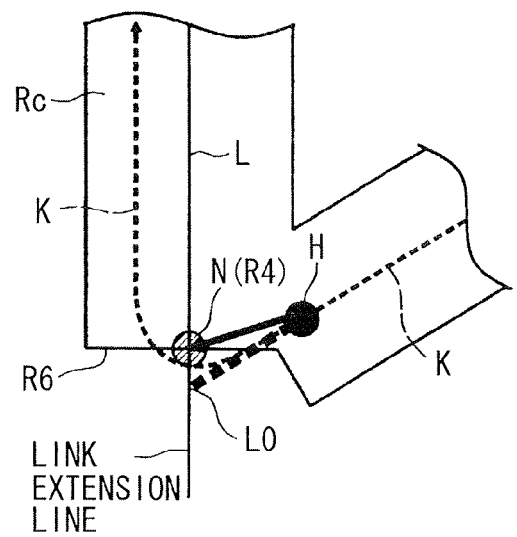
FIG. 16B is an explanatory view showing a method for setting a return point when a vehicle enters a road through a region around a road start portion.

Alternatively, as shown in FIG. 16B, when the vehicle Ca goes through a road side end close to the road start portion R6, the link L may not exist on an extension line extended from the entry point H. In this case, the return point R4 after correction is set to the start end node N of the road start portion R6 on the side of a point, which is denoted by the reference numeral L0 in FIG. 16A. The point L0 is an intersection between the extension line, which is extended from the entry point H in the average direction, and the extension line of the link L. In this way, the return point R4 can be set on the existing link L and may be useful.

Figure 17:
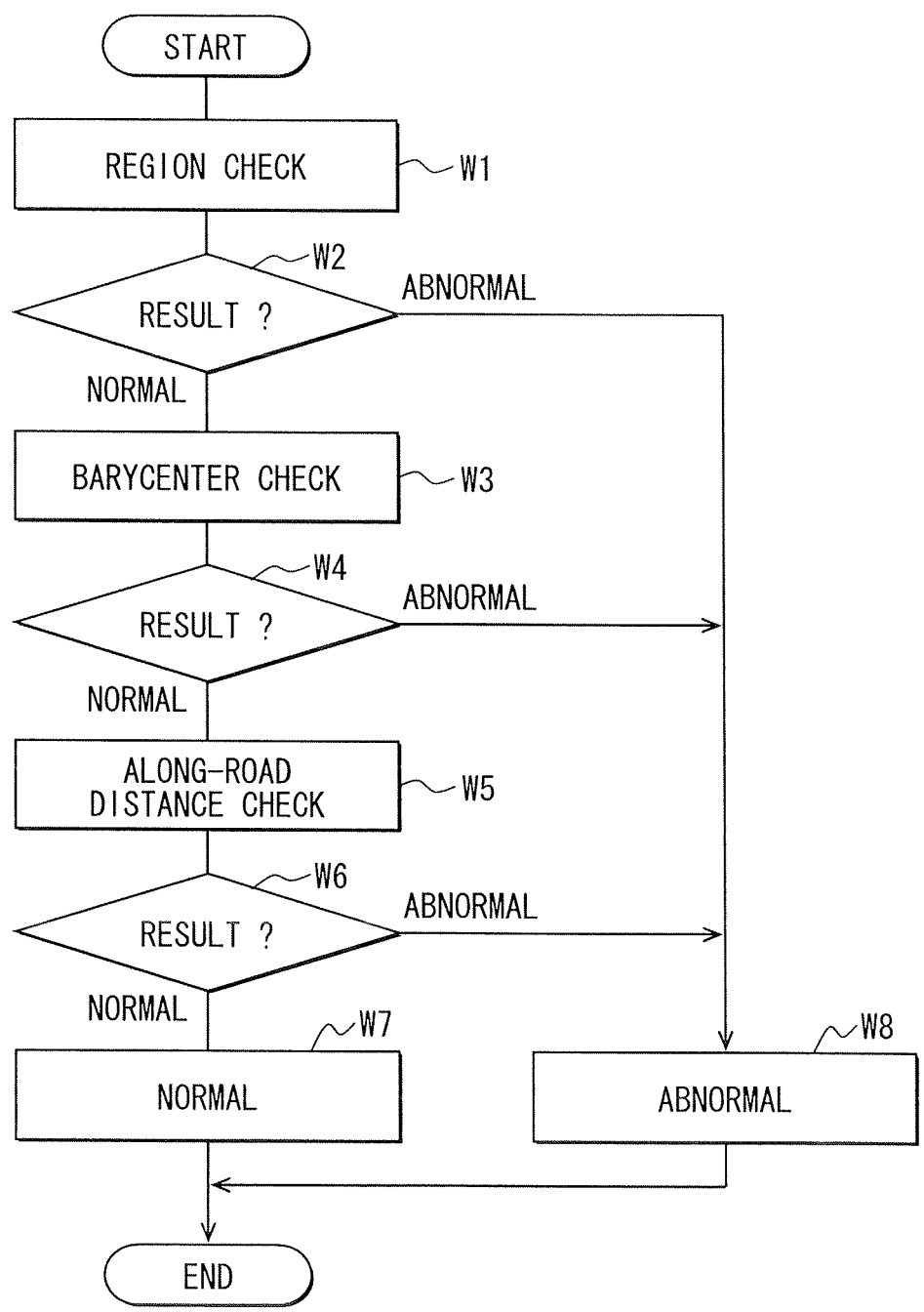
FIG. 17 is a flow chart showing conditions for registering a new road candidate as a new road.

Referring to FIG. 3, subsequent to completion of the correction operation at steps S3, S4, the control unit 2 executes a former shape comparison operation for the new road candidate at step S5. FIG. 17 is a flow chart showing a procedure of the former shape comparison operation. In the procedure of FIG. 17, at W1, the control unit 2 executes a region check operation. At W3, the control unit 2 executes a barycenter check operation. At W5, the control unit 2 executes an along-road distance check operation. When all the check operations at steps W1, W3, and W5 satisfy conditions, the control unit 2 determines that there is no abnormality at all steps W2, W4, and W6 respectively. In this case, at step W7, the control unit 2 determines that there is no abnormality (problem) in registration of the new road candidate. Thus, the new road candidate is registered as a new road. Contrary, when the control unit 2 determines that there is an abnormality at, at least one of steps W1, W3, and W5, the processing proceeds to step W8. In this case, at step W8, the control unit 2 determines that there is an abnormality in registration. Thus, the control unit 2 terminates the present operation for registration of a new road candidate. When the control unit 2 determines that there is no abnormality at step W7, the control unit 2 learns the candidate of the new road Rb as a road having a standard width. Thus, the control unit 2 registers the candidate of the new road Rb.

Figure 18:
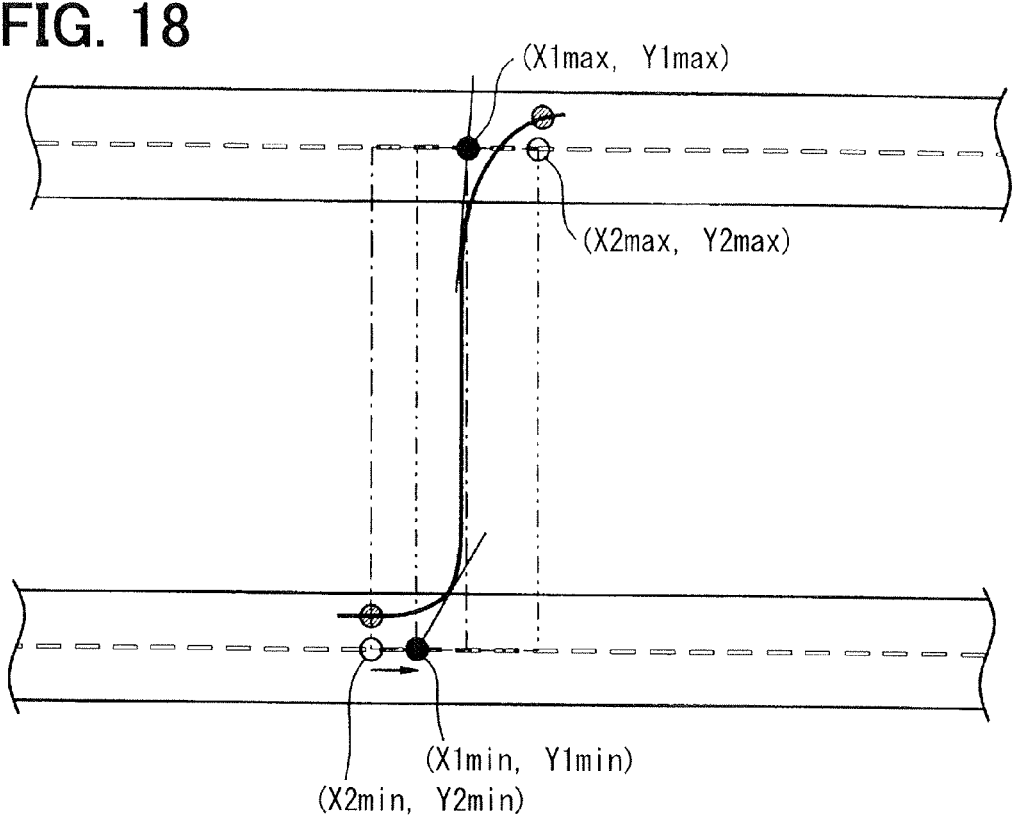
FIG. 18 is an explanatory view showing a region check operation.

FIG. 18 is an explanatory view showing the region check operation at step W1. In the region check operation, the control unit 2 calculates a difference between a set region of the new road candidate and a travel region of the travel locus. Specifically, for example, the control unit 2 calculates the coordinates (X1, Y1) of the set region of the new road candidate and the coordinates (X2, Y2) of the travel region of the travel locus in the X-Y coordinate system. Further, the control unit 2 determines whether the difference is less than a predetermined threshold.

Specifically, the present operation to determine whether the difference is less than the predetermined threshold may be executed in the following way. First, the control unit 2 calculates the distance correspondingly between the maximum X, Y coordinates (X1max, Y1max) of the new road candidate and the maximum X, Y coordinates (X2max, Y2max) of the travel locus in the X-Y coordinate system. Further, the control unit 2 calculates the distance correspondingly between the minimum X, Y coordinates (X1min, Y1min) of the new road candidate and the minimum X, Y coordinates (X2min, Y2min) of the travel locus. Further, the control unit 2 determines whether both the distances are respectively less than predetermined distances.

Figure 19:
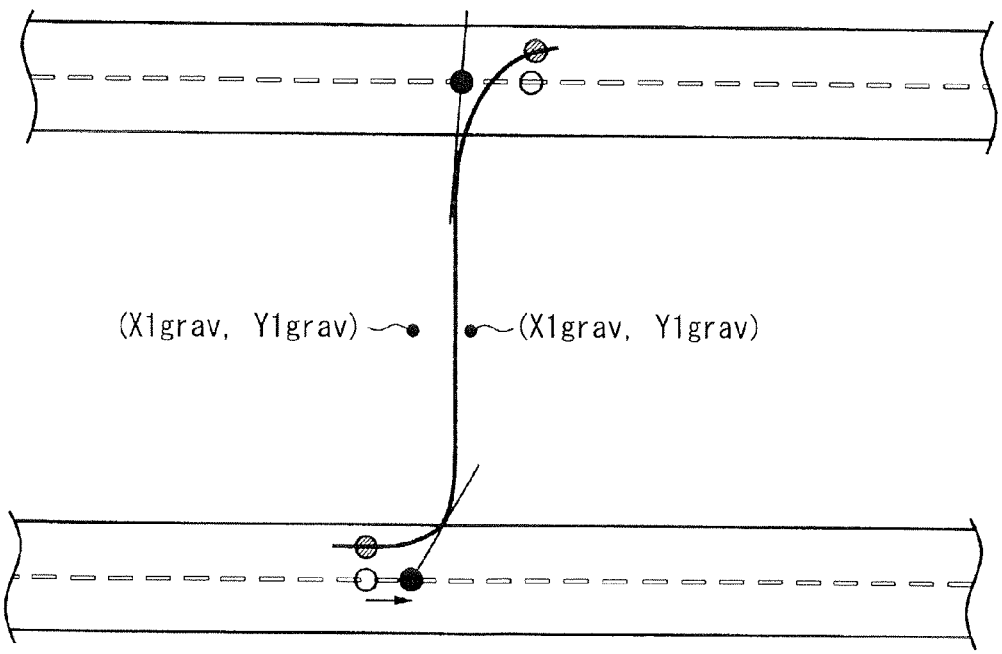
FIG. 19 is an explanatory view showing a barycenter check operation.

FIG. 19 is an explanatory view showing the barycenter check operation at step W3. In the barycenter check operation, the control unit 2 determines whether the difference between the position of the barycenter (gravity center) of the new road candidate and the position of the barycenter of the travel locus of the vehicle is less than a predetermined distance. Specifically, the barycenter is calculated in the following way. For example, the control unit 2 calculates a summation of the locus points of the new road candidate. Further, the control unit 2 divides the summation result by the number of summation to obtain average values of the X coordinate and the Y coordinate as the barycenter position (X1grav, Y1grav). In addition, the control unit 2 calculates a summation of the travel locus points of the vehicle. Further, the control unit 2 divides the summation result by the number of summation to obtain average values of the X coordinate and the Y coordinate as the barycenter position (X2grav, Y2grav). Further, the control unit 2 calculates the distance between the barycenter positions. On condition that the calculated distance is less than a predetermined distance, the control unit 2 determines that the difference between the barycenter positions is less than the predetermined threshold In the along-road distance check operation at step W5, the control unit 2 determines whether the difference between an along-road distance D1 of the candidate of the new road Rb and a summation D2 of an along-road travel locus of the vehicle is less than a predetermined distance. The along-road distance may represent a length of a road when the vehicle travels along the road. The along-road travel locus may represent a travel locus of the vehicle when the vehicle travels along the road.

Referring to FIG. 3, at step S5, the control unit 2 performs the former shape comparison operation. Subsequently, at step S6, when the control unit 2 determines that a correction result of the new road candidate is O.K. (proper), at step S7, the control unit 2 sends output data. Alternatively, at step S6, when the control unit 2 determines that the correction result of the new road candidate is NG. (improper), at step S8, the control unit 2 terminates the correction (learning operation). The output data may be generated in compliance with a format of a detected road. For example, the output data may include the coordinates of the exit point R2 after correction, the coordinates of the return point R4 after correction, and a learned road shape after correction. In this case, the control unit 2 registers the exit point R2 after correction as the node N of the intersection C in the map data. Further, the control unit 2 registers the return point R4 after correction as the node N of the intersection C in the map data. In this way, the learning operation of a new road is executed.

According to the present embodiment, the control unit 2 identifies the departure point G, through which the vehicle departs from the departure road Ra, according to the travel locus K of the vehicle Ca. Further, the control unit 2 sets the exit point R2 on the link L corresponding to the departure point G. Therefore, when the vehicle Ca travels on a road around an unregistered intersection C, the exit point R2 is set on the link L around the intersection C. The control unit 2 learns the new road Rb based on the exit point R2 and the travel locus K of the vehicle Ca. Thus, the control unit 2 is capable of learning the shape of the road around the intersection C correctly as much as possible.

In addition, the control unit 2 sets the return point R4 on the link L corresponding to the entry point H through which the vehicle goes into the entry road Rc. Therefore, when the vehicle Ca travels a road around an unregistered intersection, the return point R4 is set on the link L around the intersection C. The control unit 2 learns the new road Rb based on the return point R4 and the travel locus K of the vehicle Ca. Thus, the control unit 2 is capable of learning the shape of the road around the intersection C correctly as much as possible.

In addition, the control unit 2 deletes the travel locus K in the width W1, W2 of the departure road Ra. Further, the control unit 2 sets the exit point R2 according to the travel locus K other than the portion of the travel locus K in the width W1, W2 of departure road Ra. Therefore, influence of the travel locus K in the width W1, W2 of the departure road Ra with respect to the set position of the exit point R2 after correction can be eliminated. Thus, the control unit 2 is capable of learning the shape of the road around the intersection C correctly as much as possible.

In addition, the control unit 2 deletes the travel locus K in the width W1, W2 of the entry road Rc. Further, the control unit 2 sets the entry point R4 according to the travel locus K other than the portion of the travel locus K in the width W1, W2 of entry road Rc. Therefore, influence of the travel locus K in the width W1, W2 of the entry road Rc with respect to the set position of the entry point R4 after correction can be eliminated. Thus, the control unit 2 is capable of learning the shape of the road around the intersection C correctly as much as possible.

In addition, the control unit 2 may set the exit point R2 on the intersection between the extension line, which is extended along the direction of the travel locus K after the vehicle departs from the departure road Ra through the departure point G, and the link L. In addition, the traveling direction values may be obtained on continuous positions at the predetermined distance interval (e.g., 2 meters). Further, on condition that the deviation between the traveling direction values (e.g., adjacent two values) is converged within the predetermined range, the control unit 2 may set the exit point R2 on the intersection between the extension line, which is extended along the direction of the travel locus at the specific position where the deviation converges, and the link L.

The link L may not exist on the extension line extended in the direction of the travel locus K (e.g., average direction). In this case, the control unit 2 may set the exit point R2 on the end point of the link L on the side of the intersection between the extension line, which is extended in the direction of the travel locus K, and the extension line of the link L. The departure point G of the travel locus K of the vehicle may be around the road end portion R5. In this case, the control unit 2 may set the exit point R2 on the end point of the link L located in the road end portion R5 corresponding to the departure point G. The control unit 2 may set a point, which is moved from the exit point R1 before correction in the traveling direction by the turning radius of the vehicle, as the exit point R2.

In such a case, the control unit 2 sets the exit point R2 on the link L around an unregistered intersection C. Thus, the control unit 2 is capable of learning the shape of the road around the unregistered intersection C correctly as much as possible by learning the new road Rb based on the exit point R2.

In addition, the control unit 2 may set the return point R4 on the intersection between the extension line, which is extended along the direction of the travel locus K before the vehicle goes into the entry road Rc through the entry point H, and the link L. In addition, the traveling direction values may be obtained on continuous positions at the predetermined distance interval (for example, 2 meters). Further, on condition that the deviation between the traveling direction values (e.g., adjacent two values) is converged within the predetermined range, the control unit 2 may set the entry point R4 on the intersection between the extension line, which is extended along the direction of the travel locus at the specific position where the deviation converges, and the link L.

The link L may not exist on the extension line extended in the direction of the travel locus K (e.g., average direction). In this case, the control unit 2 may set the entry point R4 on the end point of the link L on the side of the intersection between the extension line, which is extended in the direction of the travel locus K, and the extension line of the link L. The entry point H of the travel locus K of the vehicle may be around the road start portion R6. In this case, the control unit 2 may set the entry point R4 on the end point of the link L located in the road start portion R6 corresponding to the entry point H. The control unit 2 may set a point, which is moved from the return point R3 before correction in the opposite direction from the traveling direction by the turning radius of the vehicle, as the return point R2.

In such a case, the control unit 2 sets the return point R4 on the link L around an unregistered intersection C. Thus, the control unit 2 is capable of learning the shape of the road around the unregistered intersection C correctly as much as possible by learning the new road Rb based on the return point R4.

The control unit 2 may compare a learned new road candidate Rb with the travel locus K of the vehicle Ca and determine whether to register the learned new road candidate Rb as the new road Rb according to the comparison result. In this case, the control unit 2 registers the learned new road candidate Rb as the new road Rb according to the comparison result. For example, on condition that the difference between a set region of the learned new road candidate Rb and the travel region of the travel locus K of the vehicle Ca is less than a predetermined threshold, the control unit 2 may register the learned new road candidate Rb as the new road Rb. For example, on condition that the difference between a barycenter and/or an along-road distance of the learned new road candidate Rb and a barycenter position and an along-road distance of the travel locus K of the vehicle Ca is less than a predetermined threshold, the control unit 2 may register the learned new road candidate Rb as the new road Rb. In this way, inappropriate registration can be evaded.

(Other Embodiment)

The present invention is not limited to the above embodiments. For example, the present invention may be modified or extended, as follows.

In the above embodiment, only the travel locus in the region of the intersection C is an object to be corrected. It is noted that a known correcting method may be applied to a region outside of the intersection C. In this way, the known correcting method may be combined with the above-described method, and the unregistered road Rb may be learned.

When the method of (2) is adopted in the connection point correction operation of step U3, it suffices that a line is extended along the direction of the travel locus after departing from the road width, and the exit point may be set to the intersection between the extended line and the link in the map link information. In this case, a line may be extended along a direction specified by two locus points after the vehicle travels from the departure point for a predetermined distance. That is, the average direction need not be necessarily calculated.

In the above embodiment, the learned road candidate is once set at step U4, and it is determined to register the learned road candidate only when the registration condition of the learned road is satisfied. It is noted that at least a part of the registration condition may be omitted. In the above embodiment, an example of a vehicle in a left-hand traffic system is described. It is noted that the above-configuration and method may be applied to a right-hand traffic system. In the above embodiment, the learning operation of a new road is executed on condition that both the above-described preconditions 1, 2 are satisfied. It is noted that the learning operation of a new road may be executed even when at least one of the above-described preconditions 1, 2 is not satisfied.

All the operations of steps W1, W3, and W5 may be omitted. Alternatively, one or two of the operations of steps W1, W3, and W5 may be omitted.

Summarizing the above embodiments, an exit point set unit is configured to set a point on a link of map link information corresponding to a departure point of a travel locus of a vehicle, which departs from a departure road, as an exit point. In this way, when a vehicle travels on an unregistered road, which is not registered in the map data, the exit point is set on the existing link corresponding to the departure point. Therefore, a learning unit is capable of learning a new road based on the exit point and the travel locus of the vehicle. Thus, the learning unit is capable of learning an unregistered road correctly as much as possible.

A return point set unit is configured to set a return point on a link of map link information corresponding to an entry point of a travel locus of a vehicle, which enters an entry road. In this way, when a vehicle travels on an unregistered road, which is not registered in the map data, the return point is set on the existing link corresponding to the entry point. Therefore, a learning unit is capable of learning a new road based on the entry point and the travel locus of the vehicle. Thus, the learning unit is capable of learning an unregistered road correctly as much as possible.

The exit point set unit may be further configured to delete a travel locus in a departure road width determined and separated (segregated) by a locus separation unit and set the exit point according to the travel locus outside of the departure road width. In this way, influence of the travel locus in the departure road width to the set position of the exit point can be eliminated. Thus, an unregistered road can be learned correctly as much as possible. The return point set unit may be further configured to delete a travel locus in an entry road width separated (segregated) by a locus separation unit and set the return point according to the travel locus outside of the entry road width. In this way, influence of the travel locus in the entry road width to the set position of the return point can be eliminated. Thus, an unregistered road can be learned correctly as much as possible.

The exit point set unit may be further configured to set the exit point on: an intersection between an extension line, which is extended from a departure point along a direction of the travel locus after departure from the departure road, and the link; or a point around the intersection. The exit point set unit may be further configured such that on condition that a deviation, which is between angles of traveling directions at positions continuously specified (sampled) at a predetermined distance, is converged within a predetermined range, the exit point set unit sets the exit point on the intersection between an extension line, which is extended from the specific position along the direction of the travel locus, and the link.

The exit point set unit may be further configured such that when a link of the map link information does not exist on the extension line extended along the direction of the travel locus, the exit point set unit sets the exit point on an end point of the link on a side of an intersection between the extension line, which is extended along the direction of the travel locus, and the extension line of the link of the map link information. The exit point set unit may be further configured to set a point, which moved from an exit point before correction in the traveling direction by a turning radius of the vehicle, as the exit point. The exit point set unit may be further configured such that, when the departure point of the travel locus of the vehicle is in a road end portion, the exit point set unit sets the exit point at an end point of the link located in the road end portion corresponding to the departure point. In this way, the exit point is set at a point on the link of the map link information around the intersection. In addition, the learning unit learns a new road based on the exit point, thereby an unregistered road can be learned correctly as much as possible.

The return point set unit may be further configured to set the return point on: an intersection between an extension line, which is extended from an entry point along a direction of the travel locus before entry of the entry road, and the link of the map link information; or a point around the intersection. The return point set unit may be further configured such that on condition that a deviation, which is between angles of traveling directions at positions continuously specified (sampled) at a predetermined distance, is converged within a predetermined range, the return point set unit sets the return point on the intersection between an extension line, which is extended from the specific position along the direction of the travel locus, and the link of the map link information.

The return point set unit may be further configured such that when a link of the map link information does not exist on the extension line extended along the direction of the travel locus, the return point set unit sets the return point on an end point of the link on a side of an intersection between the extension line, which is extended along the direction of the travel locus, and the extension line of the link of the map link information. The return point set unit may be further configured such that, when the entry point of the travel locus of the vehicle is in a road start portion, the return point set unit sets the return point at an end point of the link located in the road start portion corresponding to the entry point. The return point set unit may be further configured to set a point, which moved from a return point before correction in a direction opposite from the traveling direction by a turning radius of the vehicle, as the return point. In this way, the return point can be set on a point in the existing link of the map link information. Thus, an unregistered road can be learned correctly as much as possible.

The learning unit may be further configured to compare a learned new road candidate with the travel locus of the vehicle and determine whether to register the learned new road candidate as a new road according to the comparison result. In this case, the learning unit registers the learned new road candidate as the new road according to the comparison result. The learning unit may be further configured such that, on condition that a difference between a set region of the learned new road candidate and the travel region of the travel locus of the vehicle is less than a predetermined degree, the learning unit registers the learned new road candidate as the new road.

The learning unit may be further configured such that, on condition that a difference between a barycenter of the learned new road candidate and a barycenter of the travel locus of the vehicle is less than a predetermined distance, the learning unit registers the learned new road candidate as the new road. The learning unit may be further configured such that, on condition that a difference between an along-road distance of the learned new road candidate and an along-road distance of the travel locus of the vehicle is less than a predetermined distance, the learning unit registers the learned new road candidate as the new road. In this way, inappropriate registration can be evaded.

The above structures of the embodiments can be combined as appropriate.

The above processings such as calculations and determinations are not limited being executed by the control unit 2. The control unit may have various structures including the control unit 2 shown as an example.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A vehicular navigation device comprising:
   a control unit, the control unit being configured to:
   identify a departure point through which a travel locus of a vehicle departs from a departure road stored beforehand in map data, the map data storing map link information including a plurality of links;
   set an exit point on a first link, which is included in the map link information and is close to the departure point, the first link being one of the plurality of links, the first link corresponding to the departure point of the departure road which was identified;
   identify an entry point through which the travel locus of the vehicle enters an entry road stored beforehand in the map data;
   set a return point on a second link, which is included in the map link information and is close to the entry point, the second link being one of the plurality of links, the second link corresponding to the entry point of the entry road which was identified;
   interpolate a first portion of the travel locus, which is included in a width of the departure road and is close to the departure point, based on the departure point and the exit point;
   interpolate a second portion of the travel locus, which is included in a width of the entry road and is close to the entry point, based on the entry point and the return point; and
   learn a new road based on the travel locus of the vehicle that is interpolated,
   wherein the departure point is a point at which the travel locus of the vehicle intersects with an end side of the departure road,
   wherein the exit point is a point positioned on the first link, which is included in the width of the departure road,
   wherein the entry point is a point at which the travel locus of the vehicle intersects with an end side of the entry road, and
   wherein the return point is a point positioned on the second link, which is included in the width of the entry road,
   wherein the control unit is configured to
   interpolate a shape of the first portion of the travel locus, which is included in the width of the departure road and is close to the departure point, based on the departure point and the exit point;
   interpolate a shape of the second portion of the travel locus, which is included in the width of the entry road and is close to the entry point, based on the entry point and the return point;
   learn the new road with a corrected road shape based on the travel locus of the vehicle that is interpolated; and
   register, in the map data, the new road that is learned.

2. The vehicular navigation device according to claim 1, wherein the control unit is further configured to:
   separate the first portion of the travel locus of the vehicle;
   delete the first portion of the travel locus from the travel locus of the vehicle; and
   set the exit point according to the travel locus other than the first portion in the width of the departure road.

3. The vehicular navigation device according to claim 1, wherein
   the control unit is further configured to set the exit point on:
   an intersection between an extension line, which is extended from the departure point along a direction of the travel locus after departure from the departure road, and the first link included in the map link information; or
   a point around the intersection.

4. The vehicular navigation device according to claim 3, wherein when a link included in the map link information does not exist on the extension line extended along the direction of the travel locus, the control unit is further configured to set the exit point on an end point of the link on a side of an intersection between the extension line, which is extended along the direction of the travel locus, and an extension line of the first link included in the map link information.

5. The vehicular navigation device according to claim 1, wherein on condition that an angular difference, which is between traveling directions continuously sampled at a predetermined distance, is converged within a predetermined range at a specific position, the control unit is further configured to set the exit point on an intersection between the extension line, which is extended from the specific position along a direction of the travel locus, and the link included in the map link information.

6. The vehicular navigation device according to claim 1, wherein the control unit is further configured to move the exit point in the traveling direction by a turning radius of the vehicle to obtain a corrected exit point.

7. The vehicular navigation device according to claim 1, wherein when the departure point of the travel locus of the vehicle is in a road end portion, the control unit is further configured to set the exit point on an end point of the link located in the road end portion corresponding to the departure point.

8. The vehicular navigation device according to claim 1, wherein the control unit is further configured to:
  join the exit point, which is set, with the travel locus of the vehicle to obtain a link;
  learn the obtained link as a new road candidate; and
  determine whether to register the learned new road candidate as a new road according to a comparison result of the learned new road candidate with the travel locus of the vehicle.

9. The vehicular navigation device according to claim 8, wherein on condition that a difference between a set region of the learned new road candidate and a travel region of the travel locus of the vehicle is less than a predetermined degree, the control unit is further configured to register the learned new road candidate as the new road.

10. The vehicular navigation device according to claim 8, wherein on condition that a difference between a barycenter of the learned new road candidate and a barycenter of the travel locus of the vehicle is less than a predetermined distance, the control unit is further configured to register the learned new road candidate as the new road.

11. The vehicular navigation device according to claim 8, wherein on condition that a difference between an along-road distance of the learned new road candidate and an along-road distance of the travel locus of the vehicle is less than a predetermined distance, the learning unit is further configured to register the learned new road candidate as the new road.

12. The vehicular navigation device according to claim 1, wherein the control unit is further configured to:
  separate the second portion of the travel locus of the vehicle;
  delete the second portion of the travel locus from the travel locus of the vehicle; and
  set the return point according to the travel locus other than the second portion in the width of the entry road.

13. The vehicular navigation device according to claim 1, wherein
  the control unit is further configured to set the return point on:
    an intersection between an extension line, which is extended from the entry point along a direction of the travel locus before entry of the entry road, and the second link included in the map link information; or
    a point around the intersection.

14. The vehicular navigation device according to claim 13, wherein when the second link included in the map link information does not exist on the extension line extended along the direction of the travel locus, the control unit is further configured to set the return point on an end point of the second link on a side of an intersection between the extension line, which is extended along the direction of the travel locus, and an extension line of the second link included in the map link information.

15. The vehicular navigation device according to claim 1, wherein on condition that an angular difference, which is between traveling directions continuously sampled at a predetermined distance, is converged within a predetermined range at a specific position, the control unit is further configured to set the return point on an intersection between the extension line, which is extended from the specific position along the direction of the travel locus, and the link included in the map link information.

16. The vehicular navigation device according to claim 1, wherein when the entry point of the travel locus of the vehicle is in a road start portion, the control unit is further configured to set the return point on an end point of the link located in the road start portion corresponding to the entry point.

17. The vehicular navigation device according to claim 1, wherein the control unit is further configured to move the return point in a direction opposite from the traveling direction by a turning radius of the vehicle to obtain a corrected return point.

18. The vehicular navigation device according to claim 1, wherein the control unit is further configured to:
  join the return point, which is set, with the travel locus of the vehicle to obtain a link;
  learn the obtained link as a new road candidate; and
  determine whether to register the learned new road candidate as a new road according to a comparison result of the learned new road candidate with the travel locus of the vehicle.

19. The vehicular navigation device according to claim 18, wherein on condition that a difference between a set region of the learned new road candidate and a travel region of the travel locus of the vehicle is less than a predetermined degree, the control unit is further configured to register the learned new road candidate as the new road.

20. The vehicular navigation device according to claim 18, wherein on condition that a difference between a barycenter of the learned new road candidate and a barycenter of the travel locus of the vehicle is less than a predetermined distance, the control unit is further configured to register the learned new road candidate as the new road.

21. The vehicular navigation device according to claim 18, wherein on condition that a difference between an along-road distance of the learned new road candidate and an along-road distance of the travel locus of the vehicle is less than a predetermined distance, the control unit is further configured to register the learned new road candidate as the new road.

22. A method for learning a new road for a vehicular navigation device, the method comprising:
  identifying a departure point through which a travel locus of a vehicle departs from a departure road stored beforehand in map data, the map data storing map link information including a plurality of links;
  setting an exit point on a first link, which is included in the map link information and is close to the departure point, the first link being one of the plurality of links, the first link corresponding to the identified departure point of the departure road;
  identifying an entry point through which the travel locus of the vehicle enters an entry road stored beforehand in the map data;
  setting a return point on a second link, which is included in the map link information and is close to the entry point, the second link being one of the plurality of links, the second link corresponding to the identified entry point of the entry road;

interpolating a first portion of the travel locus, which is included in a width of the departure road and is close to the departure point, based on the departure point and the exit point;

interpolating a second portion of the travel locus, which is included in a width of the entry road and is close to the entry point, based on the entry point and the return point;

obtaining a new road based on the travel locus of the vehicle that is interpolated; and registering, in the map data, the new road that is learned, wherein the departure point is a point at which the travel locus of the vehicle intersects with an end side of the departure road, wherein the exit point is a point positioned on the first link, which is included in the width of the departure road, wherein the entry point is a point at which the travel locus of the vehicle intersects with an end side of the entry road, wherein the return point is a point positioned on the second link, which is included in the width of the entry road, wherein
- the interpolating of the first portion interpolates a shape of the first portion of the travel locus, which is included in the width of the departure road and is close to the departure point, based on the departure point and the exit point;
- the interpolating of the second portion interpolates a shape of the second portion of the travel locus, which is included in the width of the entry road and is close to the entry point, based on the entry point and the return point; and
- the obtaining of the new road obtains the new road with a corrected road shape based on the travel locus of the vehicle that is interpolated.

23. A computer readable medium comprising instructions executed by a computer, the instructions including the method according to claim 22.

* * * * *